United States Patent
Enokizono

(10) Patent No.: US 9,823,885 B2
(45) Date of Patent: Nov. 21, 2017

(54) IMAGE FORMING APPARATUS

(71) Applicant: KYOCERA Document Solutions Inc., Osaka (JP)

(72) Inventor: Yuki Enokizono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/197,226

(22) Filed: Jun. 29, 2016

(65) Prior Publication Data

US 2016/0378413 A1 Dec. 29, 2016

(30) Foreign Application Priority Data

Jun. 29, 2015 (JP) ................................. 2015-129791

(51) Int. Cl.
- *G06F 3/12* (2006.01)
- *H04N 1/00* (2006.01)
- *G06K 15/02* (2006.01)

(52) U.S. Cl.
CPC .......... *G06F 3/1257* (2013.01); *G06F 3/1204* (2013.01); *G06F 3/1258* (2013.01); *G06F 3/1273* (2013.01); *G06F 3/1285* (2013.01); *H04N 1/00411* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2002/0054335 A1* | 5/2002 | Sekiguchi | H04L 12/5875 358/1.15 |
| 2003/0011801 A1* | 1/2003 | Simpson | G06F 3/1204 358/1.13 |
| 2003/0202010 A1* | 10/2003 | Kerby | G06F 3/1205 715/744 |
| 2005/0146731 A1* | 7/2005 | Mitani | H04N 1/00408 358/1.1 |
| 2008/0055624 A1* | 3/2008 | Inui | H04N 1/00408 358/1.13 |
| 2010/0259789 A1* | 10/2010 | Hadano | G06F 3/121 358/1.15 |
| 2011/0199623 A1* | 8/2011 | Okuyama | H04N 1/00408 358/1.9 |

(Continued)

FOREIGN PATENT DOCUMENTS

JP 2007-156279 A 6/2007

*Primary Examiner* — Beniyam Menberu
(74) *Attorney, Agent, or Firm* — Hawaii Patent Services; Nathaniel K. Fedde; Kenton N. Fedde

(57) ABSTRACT

Provided is an image forming apparatus that is capable of proposing a user-suitable default value. The image forming apparatus, which is configured to store an operation related default value on a per-user basis as default information, includes a storage part that is configured to store an operation history on a per-user basis as operation history information and a default value determination part that is configured to determine, by referring to the operation history, whether or not an operation conducted by a user reaches a criterion for rewriting the default value and to make a propose to update the default value if the user conducted operation reaches the criterion for rewriting the default value.

2 Claims, 11 Drawing Sheets

(56) References Cited

U.S. PATENT DOCUMENTS

| | | | | |
|---|---|---|---|---|
| 2012/0053885 A1* | 3/2012 | Kato | ................... | G06F 3/1221 |
| | | | | 702/128 |
| 2014/0211256 A1* | 7/2014 | Hosotsubo | ............ | G06F 3/1219 |
| | | | | 358/1.15 |
| 2014/0253979 A1* | 9/2014 | Sasaki | ................ | H04N 1/00225 |
| | | | | 358/474 |

* cited by examiner

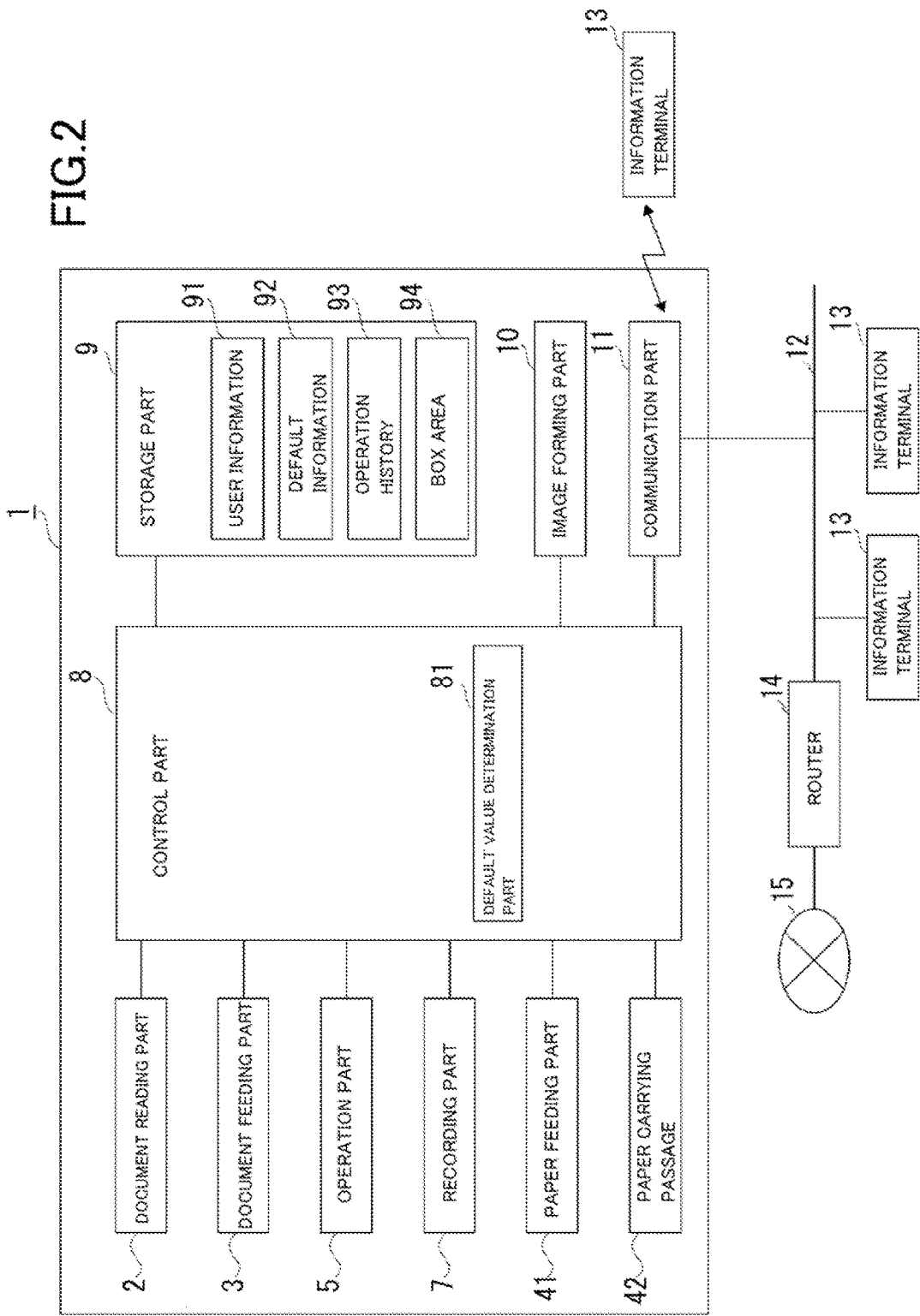

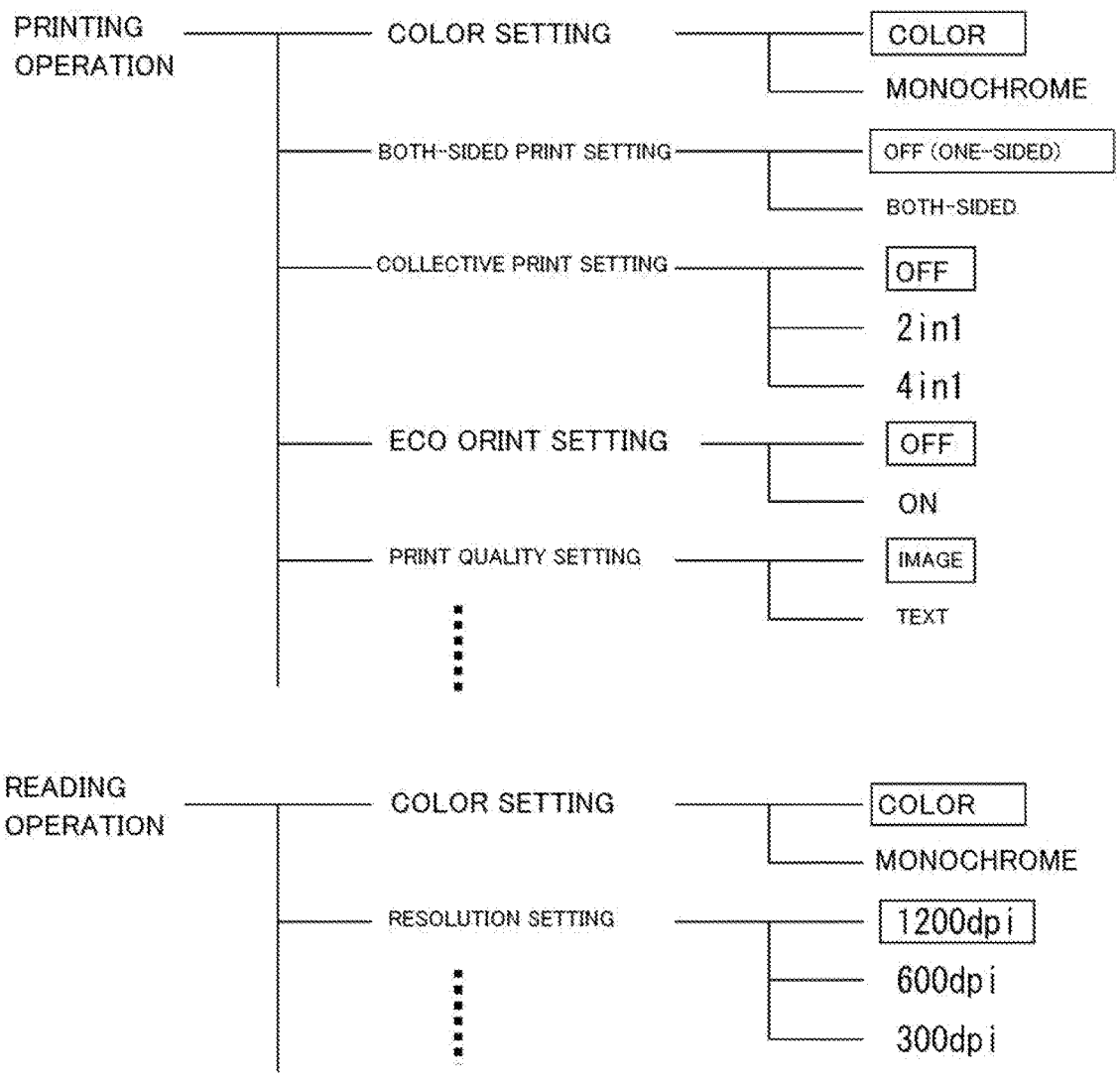

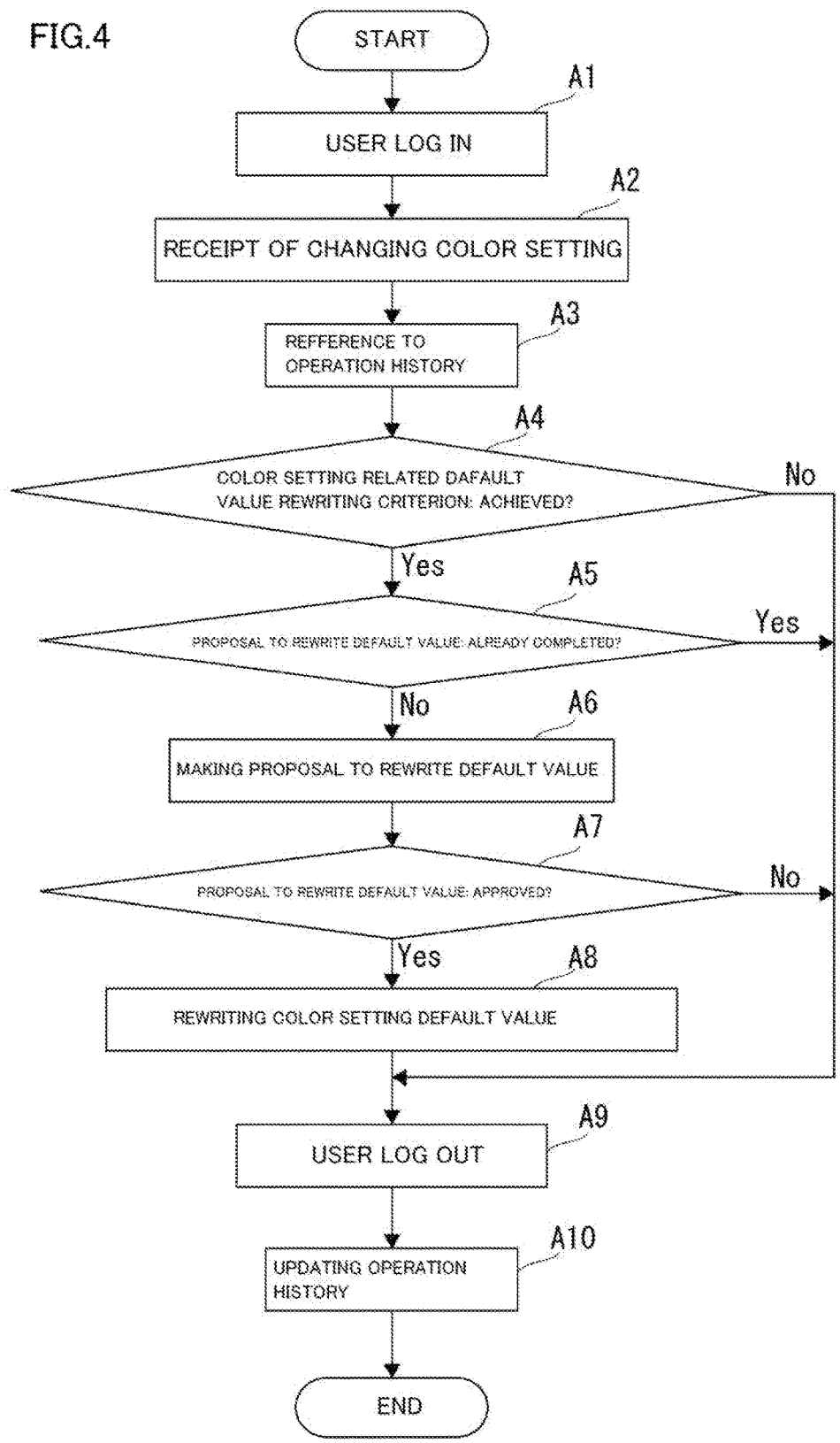

FIG.5A

CURRENT DEFAULT VALUE OF COLOR SETTING IS "COLOR".
DO YOU WANT TO REWRITE THIS TO "MONOCHROME"?

(FIVE SUCCESIVE CHANGES FROM "COLOR" TO "MONOCHROME")

Yes    No

FIG.5B

CURRENT BOTH-SIDED PRINT SETTING DEFAULT VALUE IS (OFF (ONE-SIDED)
DO YOU WANT TO REWRITE THIS TO "BOTH-SIDED"?

(EXCESS OF MAX NUMBER OF SHEETS OCCURS IN 2 SUCCESSIVE MONTHS)

Yes   No

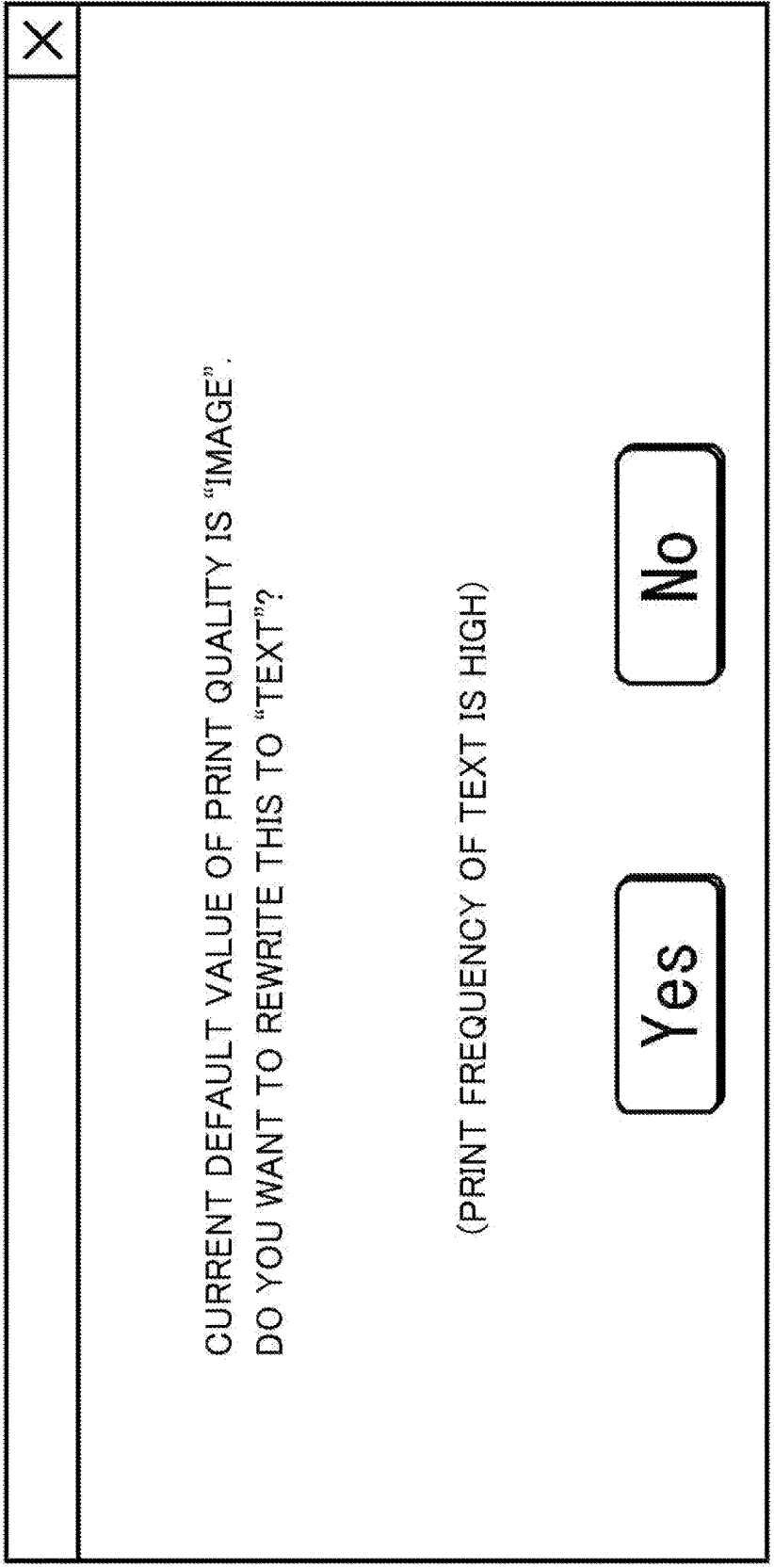

FIG.5D

CURRENT DEFAULT VALUE OF RESOLUTION IS "1200dpi".
DO YOU WANT TO REWRITE THIS TO "600dpi"?

(DATA TRANSMISSION FREQUENCY IS HIGH & LESS AVAILABLE DISK AREA)

Yes    No

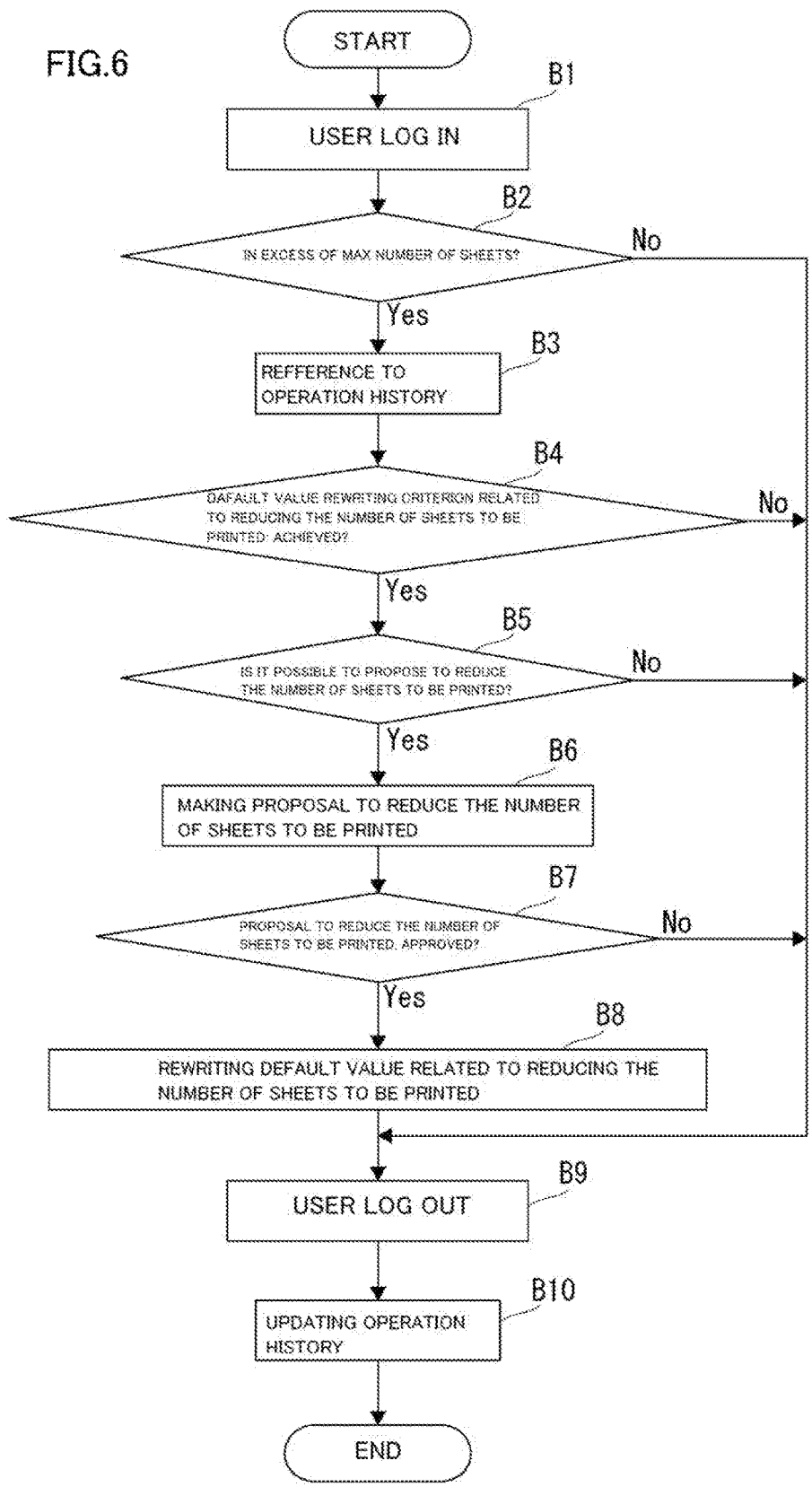

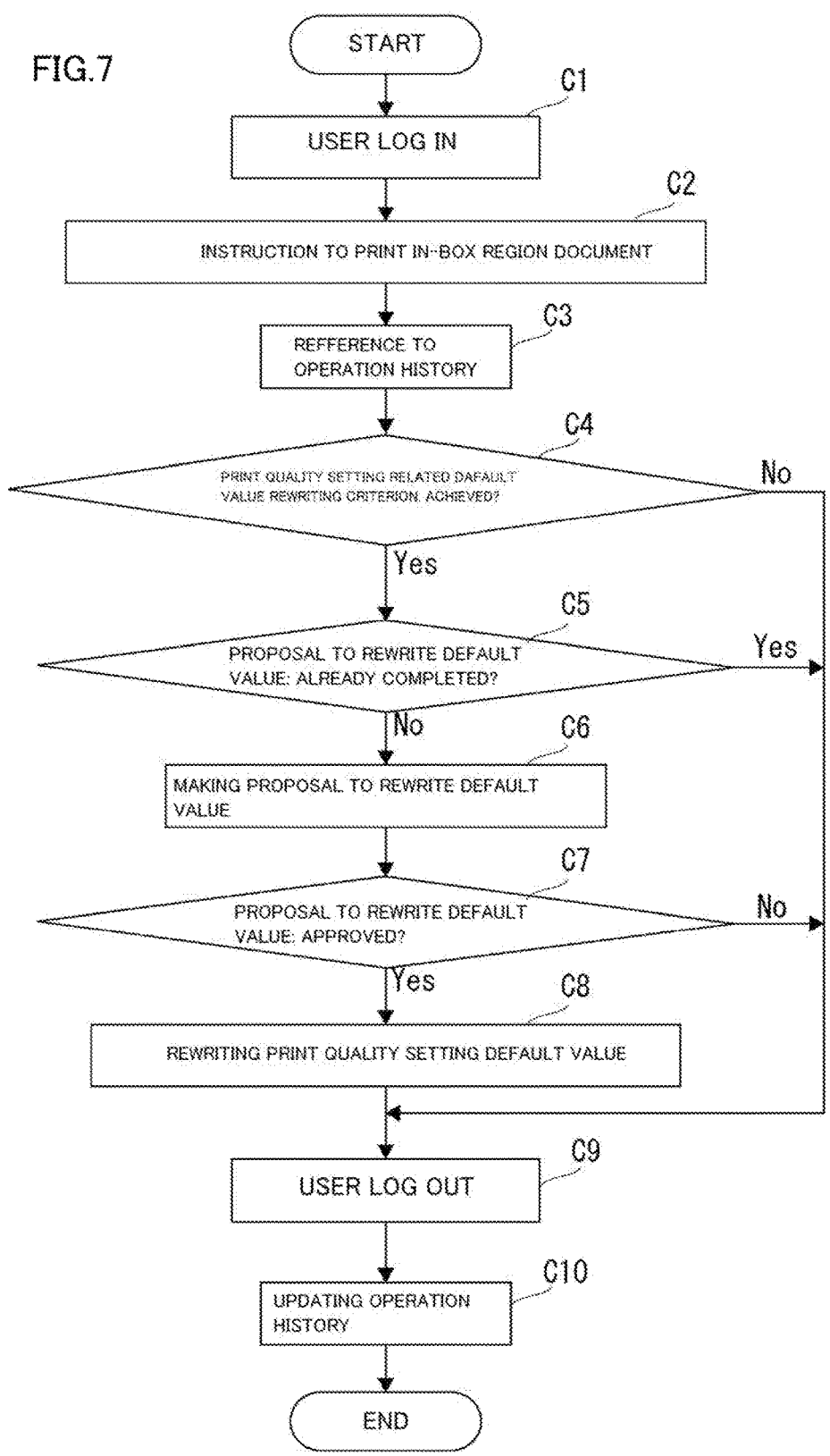

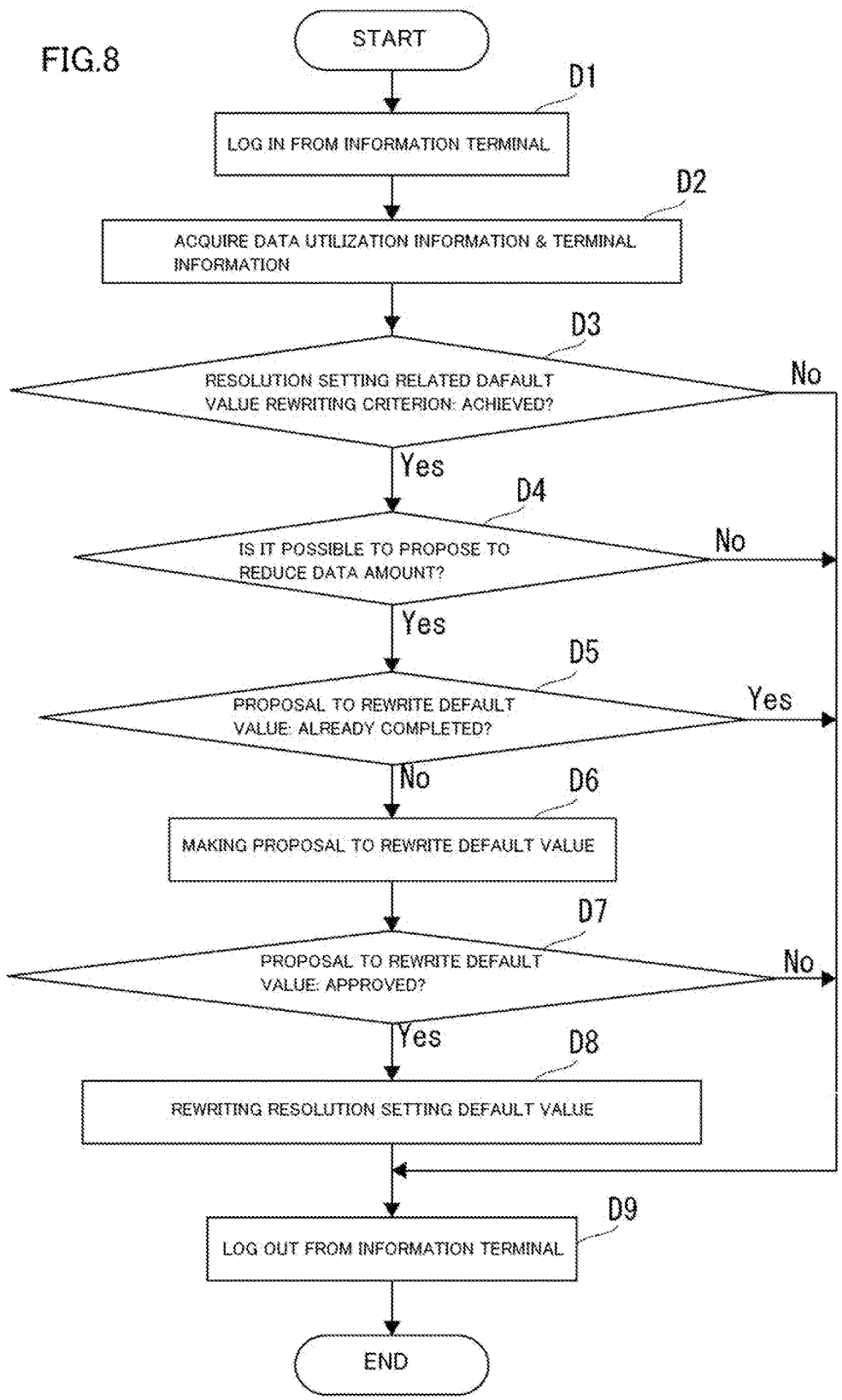

IMAGE FORMING APPARATUS

INCORPORATION BY REFERENCE

This application is based on and claims the benefit of priority from Japanese Patent Application No. 2015-129791 filed on Jun. 29, 2015, the contents of which are hereby incorporated by reference.

BACKGROUND

The present disclosure relates to an image forming apparatus that is capable of setting default values on a per-user basis which are related to various operations.

Recent image forming apparatuses that include, for example, an MFP (Multifunction Peripheral) and copier are configured to be capable of setting default values on a per-user basis which are related to various operations including, for example, a printing job.

Thereby, setting the default values which meets a user's preference will makes it possible to simplify the operations conducted by the user.

SUMMARY

An image forming apparatus according to an aspect of the present disclosure, which is configured to store an operation related default value on a per-user basis, includes an operation history storing part that is configured to store an operation history on a per-user basis, and a default value determination part that is configured to determine, by referring to the operation history, whether or not an operation conducted by a user reaches a criterion for rewriting the default value and to make a proposal to rewrite the default value if the user conducted operation reaches a criterion for rewriting the default value.

An image forming apparatus according to another aspect of the present disclosure which includes a document reading part that is configured to read an image of a document and a communication part that is configured to transmit the resulting image data to an information terminal, the image forming apparatus being configured to store a default value of a resolution related to a reading operation of the document reading part on a per-user basis, includes an information acquisition part that is configured to acquire, from the information terminal, data utilization information of the transmitted image data and terminal information, and a default value determination part that is configured to determine whether or not the data utilization information and the terminal information reach a criterion for changing the default value and to make a propose to update the default value of the resolution if both the data utilization information and the terminal information reach their criteria for rewriting the default value.

BRIEF DESCRIPTION OF THE DRAWINGS

FIG. 2 is a block diagram showing a scematic configuration of the image forming apparatus shown in FIG. 1;

FIG. 3 is a diagram showing setting examples of various operations conducted from an operation part shown in FIG. 1;

FIG. 4 is a flowchart for explaining a default value rewriting proposal operation concerning color settings which is conducted by a default value determining part shown in FIG. 2;

FIG. 5A is a view illustrating an example of the default value rewriting proposal that is displayed on a liquid crystal display part by the default value determining part shown in FIG. 2;

FIG. 5B is a view illustrating an example of the default value rewriting proposal that is displayed on the liquid crystal display part by the default value determining part shown in FIG. 2;

FIG. 5C is a view illustrating an example of the default value rewriting proposal that is displayed on the liquid crystal display part by the default value determining part shown in FIG. 2;

FIG. 5D is a view illustrating an example of the default value rewriting proposal that is displayed on the liquid crystal display part by the default value determining part shown in FIG. 2;

FIG. 6 is a flowchart for explaining a default value rewriting proposal operation by the default value determining part shown in FIG. 2 with respect to reducing the number of sheets to be printed;

FIG. 7 is a flowchart for explaining a default value rewriting proposal operation by the default value determining part shown in FIG. 2 with respect to a printing quality setting; and FIG. 8 is a flowchart for explaining a default value rewriting proposal operation by the default value determining part shown in FIG. 2 with respect to a resolution setting.

DETAILED DESCRIPTION

Figure 1:
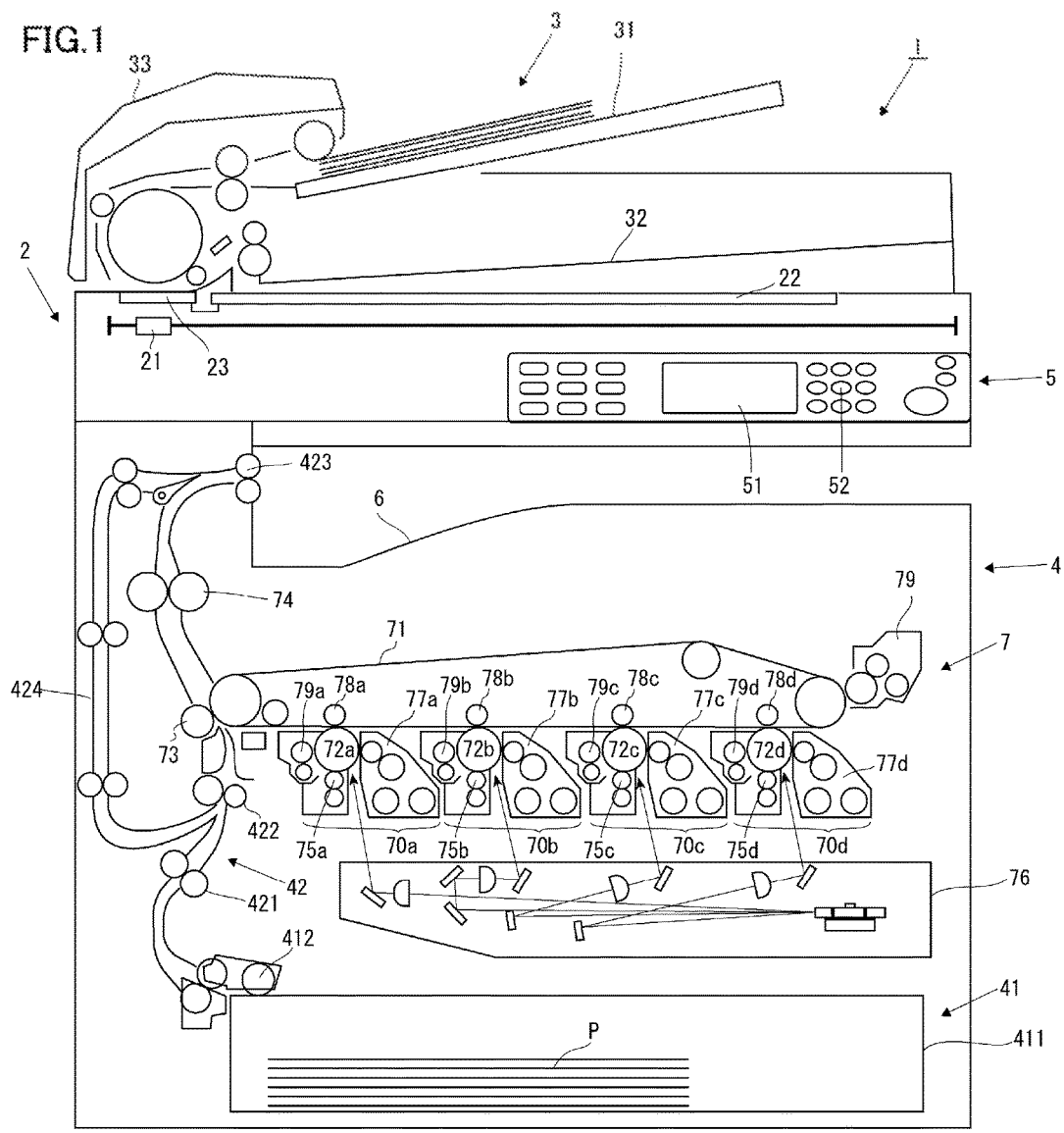
FIG. 1 is a schematic sectional view showing an internal configuration of an image forming apparatus according to an exemplary embodiment of the present disclosure.

Next, a description is detailed as to an exemplary embodiment of the present disclosure with reference to the accompanying drawings. With reference to FIG. 1, an image forming apparatus 1 of the present exemplary embodiment, which is in the form of, for example, an MFP (Multifunction Peripheral) or copier, includes a document reading part 2, a document feeding part 3, a main part 4, and an operation part 5. The document reading part 2 is provided on top of the main part 4 and the document feeding part 3 is mounted on top of the document reading part 2. The operation part 5, which is made up of, for example, a start key, numeric keys and LCDS, is located at a front side of the image forming apparatus 1.

The operation part 5 is provided with a liquid crystal display part 51 and operation key set 52. By conducting an operation on the operation part 5 for inputting an instruction, the user is allowed to cause the image forming apparatus 1 to execute its various functions that include, for example, printing and document reading operations. The liquid crystal display part 51 is configured to indicate a current status of the image forming apparatus 1, an image forming status and the number of sheets to be printed, and to act as a touch panel for allowing various operations to conduct. In addition, the operation part 5 is provided with a start button that is designed for the user to initiate an image forming job, a stop/clear button that is to be used to stop the image forming job and other buttons, which constitute the operation key set 52.

The document reading part 2 includes a scanner 21, a platen glass 22, and a document reading slit 23. The scanner 21 is made up of, for example, an LED and CCD (Charged Coupled Device) sensors and is configured to be movable in a direction along which a document is made being conveyed by the document feeding part 3. The platen glass 22 is a document tale that is formed of a transparent material such as a glass. The document reading slit 23 has a slit that formed to extend perpendicular to the direction along which a document is made being conveyed by the document feeding part 3.

In a case where the scanner 21 reads a document that is mounted or placed on the platen glass 22, the scanner 21 is moved to a position so as to be in opposition to the platen glass 22 and then reads the document mounted on the platen glass 22 while scanning the document for acquiring image data, outputting the resulting image data, to the main part 4, as printing data to be printed on a recording paper P. In addition, in a case where the scanner 21 reads a document that is being carried by the document feeding part 3, the scanner 21 is moved to a position opposed to the document reading slit 23, and reads the document through the document reading slit 23 in synchronization with the document carrying operation of the document feeding part 3 for acquiring image data, outputting the acquired image data, to the main part 4, as printing data to be printed on a recording paper P.

The document feeding part 3 includes a document mounting part 31, a document discharge part 32, and a document carrying mechanism 33. The documents placed in the document mounting part 31 are so fed in a sequential one by one manner by the document carrying mechanism 33 as to be carried to a position that is in opposition to the document reading slit 23, and thereafter are discharged into the document discharge part 32. It is to be noted that the document feeding part 3 that is configured to be pivotally movable and therefore bringing the document feeding part 3 upward makes it possible to expose of a top face of the platen glass 22 can be opened.

The main part 4 includes a recording part 7 that is configured to print on the paper P, and also includes a paper feeding part 41 and a paper carrying passage 42. The paper feeding part 41 includes a plurality of includes a paper feeding cassette 411 that is configured to accommodate therein a plurality of recording sheets P and a feed roller 412 that is configured to feed out the papers P in a sequential one by one manner from the paper feeding cassette 411 to the paper carrying passage 42. The paper carrying passage 42 includes conveyance rollers 421 that is configured to supply the recording paper P fed out to the recording part 7 from the paper feeding cassette 41, resist rollers 422 that is configured to control the timing as to when the recording paper P should be supplied to the recording part 7, discharge rollers 423 that is configured to discharge the recording paper P that is printed by the recording part 7 into an in-body tray 6, and a paper reversing passage 424 for both-sided printing. In the both-sided printing operation, first of all, one side of the recording paper P that is fed out from the paper feeding cassette 41 is printed by the recording part 7. Then, when the recording paper P is carried to reach a position at which the discharge rollers 423, the discharge rollers 423 are reversed, before the recording paper P is discharged into the in-body tray 6, to carry the recording paper P to the paper reversing passage 424. The recording paper P that is fed into the paper reversing passage 424 is carried, under the inverted condition, again to the recording part 7 and the other side of the recording paper P undergoes printing. Thus, such a both-sided printed recording paper P is discharged into the in-body discharge tray 6.

In the recording part 7, there are provided four image forming parts 70a, 70b, 70c, and 70d to cope respectively with four colors (yellow, cyan, magenta, and black) that constitute an image. In addition, an intermediate transfer belt 71 is provided in adjacent to the four image forming parts 70a, 70b, 70c, and 70d. The four image forming parts 70a, 70b, 70c, and 70d are provided, respectively, with photoconductive drums 72a, 72b, 72c, and 72d that carry visible images (toner images) in the four different colors. The toner images that are respectively formed on the photoconductive drums 72a, 72b, 72c, and 72d are transferred sequentially on the intermediate transfer belt 11 that moves in sliding engagement with the photoconductive drums 72a, 72b, 72c, and 72d. The resulting toner images on the intermediate transfer belt 11 are transferred, at a secondary transfer roller 73, onto the recording paper P that has been fed from the paper feeding cassette 41, at a time or concurrently. Thus transformed toner image on the recording paper P is fixed on the recording paper P thereon at a fixing part 74.

On a periphery of the photoconductive drums 72a, 72b, 72c, and 72d that are respectively provided in the four image forming parts 70a, 70b, 70c, and 70d in a rotatable manner, there are provided charging devices 75a, 75b, 75c, and 75d that charge respectively the photoconductive drums 72a, 72b, 72c, and 72d, an optical scanning part 76 that exposes the photoconductive drums 72a, 72b, 72c, and 72d to form respective latent images thereon, developing parts 77a, 77b, 77c, and 77d that respectively form the toner images on the photoconductive drums 72a, 72b, 72c, and 72d, primary transfer rollers 78a, 78b, 78c, 78d that respectively transfer the toner images on the photoconductive drums 72a, 72b, 72c, and 72d onto the intermediate transfer belt 71, and cleaning parts 79a, 79b, 79c, and 79d that respectively remove developing agents (toners) remaining on the photoconductive drums 72a, 72b, 72c, and 72d.

An image forming operation, first of all, begins with charging uniformly surfaces of the respective photoconductive drums 72a, 72b, 72c, and 72d by the respective charging parts 75a, 75b, 75c, and 75d, and next the optical scanning part 76 irradiates, depending on printing data, light beams to the respective photoconductive drums 72a, 72b, 72c, and 72d, thereby forming, depending on the printing data, thereon the respective latent images. In the developing parts 77a, 77b, 77c, and 77d, there are provided developing rollers that are so positioned as to be in opposition to the respective photoconductive drums 72a, 72b, 72c, and 72d, and these developing rollers respectively supply the yellow toner, cyan tonner, magenta toner, and black toner onto the photoconductive drums 72a, 72b, 72c, and 72d to establish electrostatic adhesions of these toners on the respective photoconductive drums 72a, 72b, 72c, and 72d, thereby forming the respective toner images depending on the respective latent images. Next, applying respectively specific transfer voltages to the primary transfer rollers 78a, 78b, 78c, and 78d cause, at specific timings, first transfers of the yellow toner image, the cyan toner image, magenta toner image, and black toner image on the photoconductive drums 72a, 72b, 72c, and 72d, respectively, on to the intermediate transfer belt 71 in a timed relationship, thereby forming a full-color toner image. Thereafter, the toners respectively remaining on the surfaces of the photoconductive drums 72a, 72b, 72c, and 72d are removed by the respective cleaning parts 79a, 79b, 79c, and 79d in preparation of the coming new formations of electrostatic latent images.

The intermediate transfer belt 71 is formed from a dielectric resin sheet such that both ends thereof are connected in a lap joint manner to make the belt into an endless configuration or the sheet is formed into the belt in a seamless manner. At a timing where the recording paper P is carried to between the secondary transfer roller 73 and a nip part of the intermediate transfer belt 71, causes the formed image toner images to reach the nip part of the secondary transfer roller 73, thereby performing the secondary transfer to form a full-color image on to the recording paper P. It is to be noted that the intermediate transfer belt 71 and the secondary transfer roller 73 are driven to rotate at the same linear velocity as the photoconductive drums 72a, 72b, 72c, and 72d. In addition, a cleaning part 79, which is configured to remove toner particles remaining on the surface of the intermediate transfer belt 71, is provided at an upstream side of the moving direction of the intermediate belt 71 when viewed from the image forming parts 70a, 70b, 70c, and 70d.

In FIG. 2, there is illustrated a block diagram that provides an overview of the configuration of the image forming apparatus 1. The aforementioned document reading part 2, the document feeding part 3, the operation part 5, the recording part 7, the recording paper feeding part 41, and the recording paper convey part 42 are connected to a control part 8 so that their operations are controlled by the control part 8. In addition, the control part 8 is connected with an image processing part 10 and a communication part 11.

The communication part 11 has a function of transmitting and receiving various data, respectively, to and from an information terminal 13 such as a personal computer via a network 12 such as a LAN. The communication part 11 is also configured to be connected to the Internet 15 via the network 12 and a router 14. Further, the communication part 11 has a function of transmitting and receiving various data, respectively, to and from an information terminal 14 such as a tablet PC by an NFC (Near Field Communication) based technology.

The storage part 9, which is a storage means such as a semiconductor memory or a HDD (Hard Disk Drive), is configured to store image data as printing data that is acquired by reading the document using the document reading part 2 and text data that is received from the information terminal 13. Further, the storage part 9 stores user information 91 that includes, for example, a user ID for identifying a user and a password, per-user default information 92 and per-user operation history 93, and reserves a box region 94 as per-user storage area.

The default information 92, which is indicative of default values that are set for various operations, is stored on a per-user basis. With reference to FIG. 3, for example, in order to perform a printing operation using the recording part 7, the stored default information 92 includes default values that are prepared for [COLOR SETTNG] to select either one of "Color" and "Monochrome" printings, [DUPLEX PRINT SETTING] to select either one of "OFF (one-sided) and "BOTH-SIDED" printings, [COLLECTIVE PRINT SETTING] to select either one of "OFF", "2 in 1" and "4 in 1", [ECO PRINT SETTING] to select either one of "OFF" and "ON", and [PRINTING IMAGE QUALITY SETTING] to select "IMAGE" and "TEXT", and other settings. In addition, for the operation of reading documents using the document reading part 2, the default information 92 also include default values that are prepared for [COLOR SETTNG] to select either one of "COLOR" and "MONOCHROME" readings and for [RESOLUTION SETTNG] to select either one of reading in "1200 dpi", "600 dpi" and "300 dpi", and other settings.

An operation history 93 is a history of operations that are conducted by the user manipulating the operation part 5 during a specified interval (such as one month or a half year). For example, in various operations that include, for example, print and reading operations as the operation history 93, changing input that is indicative of a settings change from the default value, the number of printed papers, and a printed document are stored. It is to be noted in the present exemplary embodiment, changing the default value to another setting value in the printing or reading operation is referred to as "a default value change", while changing the default value per se to another setting value is referred to as "a default value rewrite".

The image processing part 10 has a function of forming image data for printing based on the document data that is received from the information terminal 13. The image processing part 10 is also configured to perform specific image processing tasks in which the image data that is formed or acquired from the read documentation by reading part 2 is manipulated to perform an image improvement process such as a magnification/reduction, a density adjustment, or a gray level control.

The control part 8 is a micro-computer based information processing device or the like which includes, for example, a ROM (Read Only Memory) and a RAM (Random Access Memory). In the ROM, there is stored a control program that is designed to control an operation of the image forming apparatus 1. The control part 8 is configured to read the control program stored in the ROM and loads the resulting control program on the RAM to carry out the control of the whole apparatus based on specific information inputted from the operation part 5.

The control part 8 is configured to function as a default value determination part 81. The default value determination part 81 is configured to determine whether or not the changing input of the settings change which is received from the operation part 5 reaches a criterion for rewriting the default value and, if the determination indicates that the criterion for rewriting the default value is reached, to display a proposal of rewriting the default value on the liquid crystal display part 51.

Next, with reference to FIG. 4 and FIG. 5A, a description is made in detail with respect to a proposal operation of rewriting a default value related to [COLOR SETTING] in the printing operation. The control part 8 accepts a user's log-in by matching the user ID and the password that are inputted from the operation part 5 to the user information 91 stored in the storage part 9 (Step A1). Then, when the control part 8 receives from the operation part 5 the changing input of the setting change of the default value related to [COLOR SETTING] in the printing operation (Step A2), the control part 8 functions as the default value determination part 81.

The default value determination part 81 makes a reference to the operation history 93 stored in the storage part 9 (Step A3) and determines whether or not a [Color Setting] related default value rewriting criterion is achieved (Step A4).

The [COLOR SETTING] related default value rewriting criterion is a criterion to determine whether or not the frequency of a user's operation to change the default value in [Color Setting] is high. For example, the number of the user's operations that are conducted in a consecutive manner to change the default value or how often the default value is changed by the user is employed as the default value rewriting criterion. In a case where the number of the user's operations that are conducted in a consecutive manner to change the default value is set to 5 as the default value rewriting value and the default value of [Color Setting] is "Color", if the user changes the default value of [Color Setting], 5 (five) times in successive, from "Color" to "Monochrome", Step A4 determines that the [COLOR SETTING] related default value rewriting criterion is achieved.

If Step A4 determines that the [COLOR SETTING] related default value rewriting criterion is achieved, the default value determination part 81 determines whether or not a proposal to rewrite the [COLOR SETTING] related default value has been already completed within a specified period (for example, within one week or within one month) (Step A5). Then, if the result of Step A5 is that no proposal for rewriting the default value has been completed, the default value determination part 81 creates a color default value rewriting proposal screen as shown in FIG. 5A and causes the liquid crystal display part 51 of the of the operation part 5 to display such a screen, thereby making a proposal to rewrite the [COLOR SETTING] related default value in printing operation to the user (Step A6). On the color default value rewriting proposal screen, there are provided a message that says a proposal to rewrite the [COLOR SETTING] default value, a reason why such a proposal is made (i.e. a message saying that the default value rewriting criterion has been achieved), a "Yes" button for receiving an approval of rewriting the [COLOR SETTING] default value, and a "No" button for receiving a disapproval of rewriting the [COLOR SETTING] default value.

Then, the default value determination part 81 determines whether or not the "Yes" button is manipulated on the color default value rewriting proposal screen, that is, whether or not the user approves the proposal to rewrite the [Color Setting] default value (Step A7). If the "Yes" button is manipulated in Step A7, the default value determination part 81 rewrites the [Color] default value that is stored as default information 92 to the set value that is inputted in Step A2 (Step A8). Thereby, the next printing operation uses the set value that is inputted in Step A2 as the default value.

Then, if the user logs out (Step A9), the default value determination part 81 updates the operation history 93 stored in the storage part 9 based on the latest printing operation (Step A10) and terminates the rewriting proposing operation. It is to be noted that if the result of Step A4 indicates that the [Color Setting] related default value rewriting criterion is not achieved or if the result of Step S5 indicates that the proposal to rewrite the default value is completed, the control goes to Step A9 without causing the default value determination value 81 to make the proposal to rewrite the default value to the user as in Step A6. In addition, if the result indicated that the "No" button is manipulated in Step A7, the control goes to Step A9 without causing the default value determination value 81 to rewrite the [COLOR SETTING] default value as in Step A8.

Next, with reference to FIG. 6 and FIG. 5B, a detailed description is made as to an operation of proposal to rewrite the default value for reducing the number of sheets to be printed in the printing operation. Settings regarding the reduction of the number of sheets to be printed include, for example, [BOTH-SIDED PRINT SETTING] and [COLLECTIVE PRINT SETTING]. In the [BOTH-SIDED PRINT SETTING], setting to [Both-sided] causes the number of sheets to be printed to be more reduced than setting to [Off]. In addition, in the [COLLECTIVE PRINT SETTING], setting to [4 in 1] and to [2 in 1] causes the number of sheets to be printed to be more reduced than setting to [2 in 1] and [OFF] (ONE-SIDED), respectively.

The control part 8 verifies the user ID and the password that are inputted from the operation part 5 by referring to the user information stored in the storage part 9 in order to permit the user's log-in (Step B1). In the image forming apparatus 1 in which the maximum number of sheets to be printed during one month (from the beginning of month to the end thereof) is set in a per-user basis as a limited number of sheets to be printed, and the control part 8 determines whether or not the number of sheets to be printed which is inputted at the beginning of the printing operation is in excess of the limited number of sheets to be printed (Step B2) and acts as the default value determination part 81 if the result of Step B2 is that the limited number is excessed.

The default value determination part 81 makes a reference to the operation history 93 stored in the storage part 9 (Step B3) and determines whether or not a number of sheets reduction related default value rewriting criterion is achieved (Step A4). The number of sheets reduction related default value rewriting criterion is a criterion to determine whether or not the frequency of exceeding the limited number of sheets to be printed. For example, how often the limited number of sheets to be printed is exceeded in succession is employed as the default value rewriting criterion. In a case where the limited number of sheets to be printed is exceeded twice in succession is defined as the default value rewriting criterion and such an excess occurs in 2 (two) months in succession, the result of Step B4 determines that the number of sheets reduction related default value rewriting criterion is achieved.

If the result of Step B4 determines that the number of sheets reduction related default value rewriting criterion is achieved, the default value determination part 81 determines whether or not a proposal can be made which provides a measure of how to reduce the number of sheets to be printed (Step B5). More specifically, Step B5 determines whether or not rewriting the default value in [BOTH-SIDED PRINTING] or [COLLECTIVE PRINTING] is capable of reducing the number of sheets to be printed. Then, if the result of Step 5 is that proposing the rewriting the default value is possible, the default value determination part 81 creates a both-sided print default value rewriting proposal screen as shown in FIG. 5B and causes the liquid crystal display part 51 of the operation part 5 to display such a screen, thereby making a proposal to rewrite the [BOTH-SIDED PRINTING] default value in printing operation to the user (Step B6) as a measure of reducing the number of sheets to be printed. On the both-sided print default value rewriting proposal screen, there are provided a message that says a proposal to rewrite the [BOTH-SIDED PRINT SETTING] default value, a reason why such a proposal is made (i.e. a message saying that the limited number of sheets to be printed is excessed in 2 consecutive months), a "Yes" button for receiving an approval of rewriting the [Both-sided Print] default value, and a "No" button for receiving a disapproval of rewriting the [Both-sided Print] default value. It is possible to modify the process of Step B6 such that the default value determination part 81 creates a Collective print default value rewriting proposal screen and causes the liquid crystal display part 51 of the of the operation part 5 to display such a screen, thereby making a proposal to rewrite the [Collective Print] default value in printing operation to the user as a measure of reducing the number of sheets to be printed.

Then, the default value determination part 81 determines whether or not the "Yes" button is manipulated on the both-sided print default value rewriting proposal screen, that is, whether or not the user approves the proposal to rewrite the [BOTH-SIDED PRINT SETTING] default value (Step B7). If the "Yes" button is determined to be manipulated in Step B7, the default value determination part 81 rewrites the [BOTH-SIDED PRINT SETTING] default value (default value related to reducing the number of sheets to be printed) that is stored as default information 92 to "BOTH-SIDED"

(Step B8). Thereby, the next printing operation uses "BOTH-SIDED" as the [BOTH-SIDED PRINT SETTING] default value.

Then, if the user logs out (Step B9), the default value determination part 81 updates the operation history 93 stored in the storage part 9 based on the latest printing operation (Step B10) and terminates the rewriting proposal operation. It is to be noted that if the result of Step B2 indicates that the limited number of sheets to be printed is not exceeded, the control goes to Step B9 without causing the main control part 8 to function as the default value determination value 81. In addition, if in step B4, the default value rewriting criterion that is related to reducing the number of sheets to be printed is not achieved or if the result of Step B5 indicates that the proposal to rewrite the default value is unable, the control goes to Step B9 without causing the default value determination value 81 to make the proposal to rewrite the default value to the user as in Step B6. In addition, if the result of Step B7 indicates that the "No" button is manipulated, the control goes to Step B9 without causing the default value determination part 81 to rewrite the default value related to reducing the number of sheets to be printed as in Step B8.

Next, with reference to FIG. 7 and FIG. 5C, a detailed description is made as to an operation of proposal to rewrite the default value that is related to [PRINT QUALITY SETTING].

The control part 8 verifies the user ID and the password that are inputted from the operation part 5 by referring to the user information 91 stored in the storage part 9 in order to permit the user's log-in (Step C1). Then, the control part 8 receives a document printing instruction that is stored in the box region in the printing operation from the operation part 5 (Step C2) and acts as the default value determination part 81.

The default value determination part 81 makes a reference to the operation history 93 stored in the storage part 9 (Step C3) and determines whether or not a default value rewriting criterion related to [PRINT QUALITY SETTING] is achieved (Step C4). The default value rewriting criterion related to [PRINT QUALITY SETTING] is a criterion for determining how often documents are printed, the documents not being adequate to a [PRINT QUALITY SETTING] default value, that is, the documents being desired whose [PRINT QUALITY SETTING] value is different from the default value. It is to be noted that the file name (such as an extension) of a document will determine whether or not the [PRINT QUALITY SETTING] is suitable for printing the document. For example, the number of the printing the documents that are unsuitable for the [PRINT QUALITY SETTING] in a consecutive manner or how the percentage of the document are printed that are unsuitable for the [PRINT QUALITY SETTING]. When the documents are printed that are unsuitable for the [PRINT QUALITY SETTING] at a rate of 60%, this printing rate of 60% is defined as a default value rewriting criterion and therefore under the default value for [PRINT QUALITY SETTING] being "IMAGE", if 60% above of the printed documents is preferable for being printed under the default value for [Print Quality Setting] being [TEXT], in Step C4 it is determined that the default value rewriting criterion which is related to the [PRINT QUALITY SETTING] is achieved.

If the result of Step C4 determines that the default value rewriting criterion which is related to the [PRINT QUALITY SETTING] is achieved, the default value determination part 81 determines whether or not a proposal was made to rewrite the default value related to the [PRINT QUALITY SETTING] within a specified period (for example, within one week or within one month) (Step C5). Then, if the result of Step C5 is that no proposal for rewriting the default value has been completed, the default value determination part 81 creates a print quality default value rewriting proposal screen as shown in FIG. 5C and causes the liquid crystal display part 51 of the of the operation part 5 to display such a screen, thereby making a proposal to rewrite the [PRINT QUALITY SETTING] default value in printing operation to the user (Step C6). On the print quality default value rewriting proposal screen, there are provided a message that says a proposal to rewrite the [PRINT QUALITY SETTING] default value, a reason why such a proposal is made (i.e. a message saying that the default value rewriting criterion is excessed), a "Yes" button for receiving an approval of rewriting the [PRINT QUALITY SETTING] default value, and a "No" button for receiving a disapproval of rewriting the [Print Quality Setting] default value.

Then, the default value determination part 81 determines whether or not the "Yes" button is manipulated on the print quality default value rewriting proposal screen, more specifically, whether or not the user approves the proposal to rewrite the [PRINT QUALITY SETTING] default value (Step C7). If the "Yes" button is determined to be manipulated in Step C7, the default value determination part 81 rewrites the [PRINT QUALITY SETTING] default value that is stored as default information 92 to the set value that is suitable for the document specified in Step C2. Thereby, the next printing operation uses the set value that is suitable for the document specified in Step C2 as the [PRINT QUALITY SETTING] default value.

Then, if the user logs out (Step C9), the default value determination part 81 updates the operation history 93 stored in the storage part 9 based on the latest printing operation (Step C10) and terminates the rewriting proposal operation. It is to be noted that if the result of Step C4 determines that the default value rewriting criterion related to [PRINT QUALITY SETTING] is not exceeded or if the result of Step C5 determines that the proposal was made to rewrite the default value, the control goes to Step C9 without causing the default value determination value 81 to make the proposal to rewrite the [PRINT QUALITY SETTING] default value as in Step C6. In addition, if the result of Step C7 determines that the "No" button is manipulated, the control goes to Step C9 without causing the default value determination value 81 to rewrite the [PRINT QUALITY SETTING] default value in Step C8.

Next, with reference to FIG. 8 and FIG. 5D, a detailed description is made as to an operation of proposal to rewrite the default value that is related to [RESOLUTION SETTING] in a reading operation.

The control part 8 verifies the user ID and the password that are inputted from the information terminal 13 by referring to the user information 91 stored in the storage part 9 in order to permit the user's log-in from the information terminal 13 (Step D1) and then, the control part 8 receives data utilization information and terminal information from the information terminal (Step D2). It is to be noted that the data utilization information is a utilization history of image data that undergoes to the reading operation in the image forming apparatus 1 and after the resulting reading is transmitted to the information terminal 13. In addition, the terminal information is indicative of a utilization rate of the storage capacity in the information terminal 13.

Then, the control part 8, which acts as the default value determination part 81, determines whether or not a default value rewriting criterion related to [RESOLUTION SET- TING] is achieved (Step D3) based on the data utilization information and the terminal information which are received from the information terminal 13.

The default value rewriting criteria related to [RESOLUTION SETTING] are criteria for determining a frequency of the transmission of the image data from the information terminal 13 to other equipment and the utilization rate of the storage capacity in the information terminal 13. For example, the default value rewriting criteria are defined based on the frequency of the image data transmission=70% and the utilization rate of the storage capacity=60%. In a case where both of the frequency of the image data transmission and the utilization rate of the storage capacity are in excess of their default value rewriting criteria, Step D3 determines that the default value rewriting criteria related to [RESOLUTION SETTING] are achieved.

If Step D3 determines that the default value rewriting criteria related to [RESOLUTION SETTING] are achieved, the default value determination part 81 determines whether or not a proposal is possible to reduce the data amount (Step D4). More specifically, in Step D4, it is determined whether or not the resolution can be reduced from the default value in [RESOLUTION SETTING].

If the result of Step D4 is the proposal for reducing the data amount is possible, the default value determination part 81 determines whether or not the proposal was made to rewrite the default value related to [RESOLUTION SETTING] within a specified period (for example, within one week or within one month) (Step D5). Then, if the result of Step D5 is that no proposal for rewriting the default has been completed, the default value determination part 81 creates a resolution default value rewriting proposal screen as shown in FIG. 5D and causes the liquid crystal display part 51 of the of the operation part 5 to display such a screen, thereby making the proposal to rewrite the [RESOLUTION SETTING] default value in the reading operation to the user (Step D6). On the resolution default value rewriting proposal screen, there are provided a message that says a proposal to rewrite the [RESOLUTION SETTING] default values, a reason why such a proposal is made (i.e. a message saying that the default value rewriting criteria are achieved), a "Yes" button for receiving an approval of rewriting the [RESOLUTION SETTING] default values, and a "No" button for receiving a disapproval of rewriting the [RESOLUTION SETTING] default values.

Then, the default value determination part 81 determines whether or not the "Yes" button is manipulated on the resolution default value rewriting proposal screen, more specifically, whether or not the user approves the proposal to rewrite the [RESOLUTION SETTING] default values (Step D7). If the "Yes" button is determined to be manipulated in Step D7, the default value determination part 81 rewrites the [RESOLUTION SETTING] default values that are stored as the default information 92 to a lower value (Step D8). Thereby, at the next printing operation, the [RESOLUTION SETTING] default value is the lower value to provide a reduced resolution, which reduces the data amount.

Then, if the user logs out from the information terminal 13 (Step D9), the default value determination part 81 terminates the rewriting proposal operation. It is to be noted that the result of Step D3 indicates that the default value rewriting criteria related to [RESOLUTION SETTING] is not achieved, if the result of Step D4 indicates that the proposal to reduce the data amount is impossible to attain, or if the result of Step 5 indicates that the proposal to rewrite the default value was made, the control goes to Step D9 without causing the default value determination value 81 to make the proposal to rewrite the [RESOLUTION SETTING] default value as in Step D6. In addition, if the result of Step D7 indicates that the "No" button is manipulated, the control goes to Step D9 without causing the default value determination value 81 to rewrite the [RESOLUTION SETTING] default value in Step D8.

As detailed above, an exemplary embodiment of the present disclosure provides the image forming apparatus 1, which is configured to store the operation related default value on a per-user basis as default information 92, includes the operation history storing part (storage part 9) that is configured to store the operation history 93 on a per-user basis, and the default value determination part 81 that is configured to determine, by referring to the operation history 93, whether or not an operation conducted by a user reaches a criterion for rewriting the default value and to make a proposal of rewriting the default value if the result of the determination is that the user conducted operation reaches the criterion for rewriting the default value.

This configuration is capable of making the proposal to rewrite the default value that is an unexpected value for the user to a default value that meets with the user's inclination.

Sometimes, in typical image forming apparatuses, the default value is out of coincidence with the user's inclination, which brings in a creation of unnecessary expense in printing based on the default value. For example, in a case where the default value of Color Setting is "Color", the default value being changed to "Monochrome" by the user for copying, sometimes the user may forget changing to "Monochrome". In such a case, the reflection of the default value on a printing will execute a color printing, thereby causing an unnecessary expense. This fails to comply with the user's needs to reduce the expense as much as possible.

An object of the present disclosure is to provide, in order to overcome the aforementioned problem, an image forming apparatus that is cable of making a proposal to a user preference default value.

The present disclosure can provide an effect of making a proposal to rewrite an unexpected default value for the user to a user suitable default value.

Further, an exemplary embodiment of the present disclosure employs, as the default value rewriting criterion, a criterion that determines a change frequency that is indicative of how often the default value is changed an operation conducted by the user, and allows the default value determination part 81, when the change frequency reaches the criterion for rewriting the default value, to make a proposal to rewrite the default value to a setting value changed according to a result of an operation conducted by the user.

With this configuration, it is possible to reduce an erroneous setting and a wrong printing with a missing setting, thereby reducing the resulting wasted matter with an expected cost reduction.

Further, according to an exemplary embodiment, the criterion for rewriting the default value is a criterion that determines a frequency that is indicative of how often the number of recording papers to be printed exceeds a maximum limitation of the number of recording papers to be printed, and the default value determination part 81 is configured, when the frequency reaches the criterion for rewriting the default value, to make a proposal to rewrite the default value related to a reduction of the number of recording papers to be printed.

With this configuration, it is possible to reduce the number of recording papers to be printed with an expected cost reduction.

Moreover, according to an exemplary embodiment, the criterion for rewriting the default value is a criterion that determines a printing frequency that is indicative of how many times a printing operation is made that is out of coincidence with the default value, and the default value determination part is configured, when the printing frequency reaches the criterion for rewriting the default value, to make a proposal to rewrite the default value to a set value that is suitable for printing the document.

With this configuration, it is possible to propose a more effective default value. For example, under certain circumstances when a recommendation of rewriting a default value, it is possible to display, together with the default value rewriting, a description the benefit resulting from the default value rewriting, which allow the user to recognize the effect of a function which he/she has not known until now. Thus, there are possibilities of advertising the functions of the image forming apparatus 1 and more efficiently utilizing the functions than ever (For example, if [TEXT] as the setting value of [PRINTING QUALITY SETTING] is a unique function for only the company concerning the MFP 1, the changing proposal will make the [TEXT] function known to the user.)

Moreover, an exemplary embodiment of the present disclosure provides an image forming apparatus 1 that includes a document reading part 2 that is configured to read an image of a document and a communication part 11 that is configured to transmit the resulting image data of the document to an information terminal 13, and configured to store a default value of a resolution related to a reading operation of the document reading part 2 on a per-user basis as default information 92, the image forming apparatus including an information acquisition part (control part 8) that is configured to acquire, from the information terminal 13, data utilization information of the transmitted image data and terminal information and a default value determination part 81 that is configured to determine whether or not the data utilization information and the terminal information reach their default value rewriting criteria and to make a proposal to rewrite the default value for a resolution setting if the result of the determination is that both the data utilization information and the terminal information reach their default value rewriting criteria.

With this configuration, it is possible to provide preferable information based on how the transmitted image data is used, thereby allowing the user to make the system configuration his/her preference.

Needless to say, it is apparent that the present disclosure is not limited to the aforementioned exemplary embodiments and each of the exemplary embodiments may be changed or modified appropriately within the scope of the spirit of the present disclosure. In addition, the number, position, shape or geometry, and other factor of each element are not limited to those in the aforementioned exemplary embodiments and may be made suitable for practicing the present disclosure. It is to be noted that in the figures same elements are designated by same reference codes.

What is claimed is:

1. An image forming apparatus, which is configured to store an operation related default value on a per-user basis, comprising:

an operation history storing part that is configured to store an operation history on a per-user basis;

a default value determination part that is configured to determine, by referring to the operation history, whether or not an operation conducted by a user reaches a criterion for rewriting the default value and to make a proposal of rewriting the default value if the user-conducted operation reaches the criterion for rewriting the default value and not to make a proposal of rewriting the default value if the user-conducted operation does not reach the criterion for rewriting the default value, and a recording part that is configured to print to a paper based on a setting designated by the default value, wherein the criterion for rewriting the default value is a criterion that determines a frequency that is indicative of how often the number of recording papers to be printed exceeds a maximum limitation of the number of recording papers to be printed, wherein the default value is related to reduction of the number of recording papers to be printed and the default value related to reduction of the number of recording papers to be printed provides a setting for both-sided printing and collective printing, and wherein the default value determination part is configured, when the frequency reaches the criterion for rewriting the default value, to make a proposal to rewrite the default value related to reduction of the number of recording papers to be printed.

2. An image forming apparatus including a document reading part that is configured to read an image of a document and a communication part that is configured to transmit the resulting image data of the document to an information terminal and configured to store a default value of a resolution related to a reading operation of the document reading part on a per-user basis, the image forming apparatus comprising:

an information acquisition part that is configured to acquire, from the information terminal, data utilization information of the transmitted image data and terminal information; and a default value determination part that is configured to determine whether or not the data utilization information and the terminal information reach their criteria for rewriting the default value of the resolution and to make a proposal to rewrite the default value if both the data utilization information and the terminal information reach their criteria for rewriting the default value and not to make a proposal of rewriting the default value if the user-conducted operation does not reach the criterion for rewriting the default value, wherein the default value of the resolution is defined based on a frequency of transmission and a utilization rate of a storage capacity, and wherein the document reading part is configured to read the image of the document at a resolution designated by the default value.

* * * * *